United States Patent
Baldock

[11] Patent Number: 5,909,940
[45] Date of Patent: Jun. 8, 1999

[54] VEHICLE BODY ALIGNMENT APPARATUS

[76] Inventor: James Baldock, P.O. Box 23424, Oakland, Calif. 94623

[21] Appl. No.: 08/677,384

[22] Filed: Jul. 9, 1996

[51] Int. Cl.⁶ ..................................................... G01B 5/25
[52] U.S. Cl. ................................. 33/608; 33/288; 33/533
[58] Field of Search ............................ 33/608, 288, 286, 33/533, 645, 600, 546, 551, 552; 73/705

[56] References Cited

U.S. PATENT DOCUMENTS

| | | |
|---|---|---|
| Re. 32,926 | 5/1989 | Colby . |
| 2,086,402 | 7/1937 | Countryman . |
| 4,165,567 | 8/1979 | Olsson . |
| 4,193,203 | 3/1980 | LeGrand et al. ........................... 33/288 |
| 4,302,883 | 12/1981 | MacGregor . |
| 4,319,402 | 3/1982 | Martin . |
| 4,321,754 | 3/1982 | Colby ........................................ 33/608 |
| 4,329,784 | 5/1982 | Bjork ........................................ 33/608 |
| 4,442,608 | 4/1984 | Clausen ..................................... 33/288 |
| 4,479,305 | 10/1984 | Wendl et al. .............................. 33/600 |
| 4,558,521 | 12/1985 | Steck et al. ............................... 33/533 |
| 4,573,273 | 3/1986 | Eck .......................................... 33/608 |
| 4,731,936 | 3/1988 | Aldrich . |
| 4,939,848 | 7/1990 | Armstrong . |
| 4,958,439 | 9/1990 | Dehn . |
| 4,961,266 | 10/1990 | Papesh . |
| 5,014,442 | 5/1991 | LeGrand et al. ........................... 33/608 |
| 5,193,288 | 3/1993 | Stifnell . |
| 5,343,628 | 9/1994 | Ham . |
| 5,515,613 | 5/1996 | Hinson ...................................... 33/608 |

FOREIGN PATENT DOCUMENTS

| | | | |
|---|---|---|---|
| 2711916 | 9/1978 | Germany .................................. 33/608 |
| 148002 | 11/1981 | Japan ....................................... 33/608 |

OTHER PUBLICATIONS

Benchrack pamphlet of the Car–O–Liner, Oct. 1988.

*Primary Examiner*—Diego Gutierrez
*Assistant Examiner*—Andrew Hirshfeld
*Attorney, Agent, or Firm*—Brian Beverly

[57] ABSTRACT

An improved vehicle body repair apparatus comprising a rigid planar framework, horizontal bars adjustably attached to the framework, and extension members adjustably attached to and depending from the horizontal bars, the extension members comprising set point members for making contact with set points on undamaged portions of a damaged vehicle, and the extension members including a repair set point extension member for creating a reference point with respect to which the damaged portion of the vehicle can be repaired.

19 Claims, 8 Drawing Sheets

VEHICLE BODY ALIGNMENT APPARATUS

BACKGROUND

This invention relates generally to automotive repair equipment, and in particular to an improved apparatus for use in repair of vehicle bodies. This invention relates more specially to vertical realignment repairs of vehicle bodies. This invention also relates to an inexpensive, portable improved apparatus for use in repairing upper body portions of automobile vehicle bodies.

For the proper repair of damaged vehicle bodies the correct measurements of the damaged portion of the vehicle must be accurately determined relative to the undamaged portion of the vehicle. Typically repairs are effected by bending major structural portions of the vehicle, e.g., the aprons, radiator support,. inner structure or undercarriage, into proper alignment with the undamaged portion of the vehicle. Generally the structure of the vehicle must be aligned properly both horizontally and vertically. Alternately, where the structural misalignment is relatively minimal, the structure itself may not need to be realigned. If sufficient adjustments in position can be made in attaching component parts, e.g., the hood, fenders, bumpers or quarter panels, onto the misaligned major structural components, the component parts can be secured in place in correct reference to the undamaged portions of the vehicle.

Very sophisticated and powerful machines are available directed primarily to repairing the undercarriages of vehicles. Typically these machines are supported on a strong surface and the vehicle is brought into position over the device. Repairs are effected by determining the position of portions of the undercarriage relative to the device, frequently using reference data in book form. While these machines perform well for undercarriage repairs, they are large in size, cumbersome, and very expensive. Such machines are designed primarily for portions of the vehicle body above the undercarriage and thus have diminished utility when used for upper body repairs. Notably, upper body repairs constitute the majority of all vehicle body repair work. Consequently, for body repair shops handling primarily upper body repair work, machines designed primarily for undercarriage repairs can be inefficient and prohibitively expensive.

Myriad mechanisms exist to assist in alignment of vehicle bodies, but most of them provide beneficial assistance only with horizontal alignment. Absent very sophisticated and costly equipment, the body shop may be left with no accurate method of vertically aligning the vehicle and must resort to visual estimation. Therefore, it is not unusual for the major structural elements of the vehicle body to be properly aligned horizontally, but left misaligned vertically. This creates problems with the proper fitting of component parts and is aesthetically unacceptable.

Body alignment machines in the prior art require anchoring the vehicle in place with respect to the alignment machine and are inefficient for upper body repairs. Others suffer from being overly complicated to use, or from being prohibitively expensive. The less expensive devices are best suited to horizontal alignment repairs, leaving vertical repairs unaddressed.

SUMMARY OF THE INVENTION

A primary object of the invention is to provide an improved tool for use in vehicle body repairs. Another object of the invention is to provide an improved tool to properly determine the vertical alignment of a vehicle frame and its structural components. A further object of the invention is to provide an inexpensive, portable improved tool for upper vehicle body repairs. Another object of the invention is to provide an improved tool for use in vehicle body repairs to properly determine the horizontal alignment of the frame and its structural components. A yet further objective is to provide a tool for use in vehicle body repairs that is inexpensive to manufacture, portable and easy to use.

A typical vehicle collision creates damage to only one area of the vehicle, frequently a single corner or a single side, leaving the remaining portions of the vehicle unaltered. Most of the time only the upper body suffers damage. Three set point extension members mounted on undamaged (hence, properly aligned) areas of the vehicle can be used to suspend a rigid framework in an elevated position above the vehicle. Using the rigid framework, this invention takes useful advantage of the general transverse symmetry of most portions of vehicles to create a reference field using the undamaged portion of the vehicle transversely opposite the damaged portion of the vehicle with respect to which the damaged portion of the vehicle may be repaired. Measurements are simply taken of the undamaged vehicle body transversely opposite the damaged portion of the vehicle. These measurements are transferred to the damaged portion of the vehicle to indicate its correct arrangement. Either major structural portions of the vehicle, e.g., the aprons or the core support, may be aligned or, where misalignments are to an acceptable minimum, component parts, such as a fender or quarter panel, may be properly positioned on the misaligned structural portions. Since the invention is mounted directly on the undamaged portions of the vehicle, the need for independent support is eliminated. Upper body repairs can easily, cheaply and quickly be performed using only the symmetry of the vehicle. The invention is especially useful for vertical alignment of the frame, and can therefore be used as a complement to other equipment directed primarily to horizontal repairs. It can also be used independently for horizontal structural repairs and alignments as a less expensive alternative to other equipment.

A vehicle body repair apparatus according to the invention includes a rigid framework. The framework must be rigid to extend the field of reference of the undamaged areas of the vehicle. In its most common configuration, the framework is planar and rectangular. Two horizontal bars are adjustably attached to the rigid framework, allowing the horizontal bars to be moved independently along the rigid framework longitudinally and transversely with respect to the framework. Extension members are adjustably attached to each end of the horizontal bars allowing the extension members to be adjusted transversely and longitudinally with respect to the horizontal bars. The extension members are thus adjustable in three dimensions with respect to the rigid framework and, hence, the vehicle.

Three set point extension members in contact with the set points on the vehicle, that is, three undamaged, and hence accurately aligned areas of the vehicle, are used to establish a stable position of the rigid framework for calculating the proper position of a repair reference point extension member adjacent the damaged area. Typically three of the extension members are mounted to the vehicle at predetermined set points such as on the upper apron, the wheel house reinforcement, fenders, or rear or hood hinges. The rigid framework can then be suspended in an elevated position above the vehicle body. If the vehicle is damaged at a point transversely opposite one of the mounted set point extension members, another extension member acting as a repair reference point extension member can be used to determine the proper coordinates to which to repair the damaged area by comparison to the coordinates of the opposing set point extension member. The repair reference point extension member is merely placed at a point transversely opposed and longitudinally and vertically equivalent to the position of the opposing set point extension member. If the damaged area has a transversely symmetrical equivalent in an undamaged vehicle, as for example, the upper aprons, the repair reference point extension member can be positioned quite easily. If the vehicle is damaged elsewhere than opposite one of the mounted set points, additional extension members can be used to measure the undamaged portion of the vehicle transversely opposite the area of damage. Another extension member acting as a repair reference point extension member can then be positioned to indicate the proper coordinates to which to repair the damaged area.

The rigid framework is typically rectangular and the horizontal bars and extension members are interconnected so that, while they are adjustable in multiple dimensions, the bars and extension members retain their right angle attitude with respect to each other. The rigidity of the framework, bars and extension members enables the user to quickly and easily determine the position of the repair reference point extension member. The damaged area of the vehicle's structure can then be bent to bring it into contact with the repair reference point extension member. Alternatively, if the misalignment is sufficiently small, a component part can be attached to the vehicle's structural member using the repair reference point extension member as a reference point with respect to which to properly and accurately position the part.

DETAILED DESCRIPTION OF THE ILLUSTRATED EMBODIMENT

A vehicle body repair apparatus according to the invention is described as illustrated.

A vehicle body repair apparatus comprises a rigid framework 10. In the preferred embodiment, best seen in FIG. 1, the framework 10 will be planar and rectangular. The framework 10 also could be oval, circular or any other shape, or even nonplanar. Similarly, the framework 10 could consist of round bars rather than square shaped bars. However, the planar rectangular shape facilitates maintaining the sides of the framework 10 at right angles to parts to which it is attached. Further, in another embodiment of the invention shown in FIG. 4, for additional rigidity the rigid framework 10 comprises double parallel side bars, each set of double side bars forming one side of the framework 10.

Figure 1:
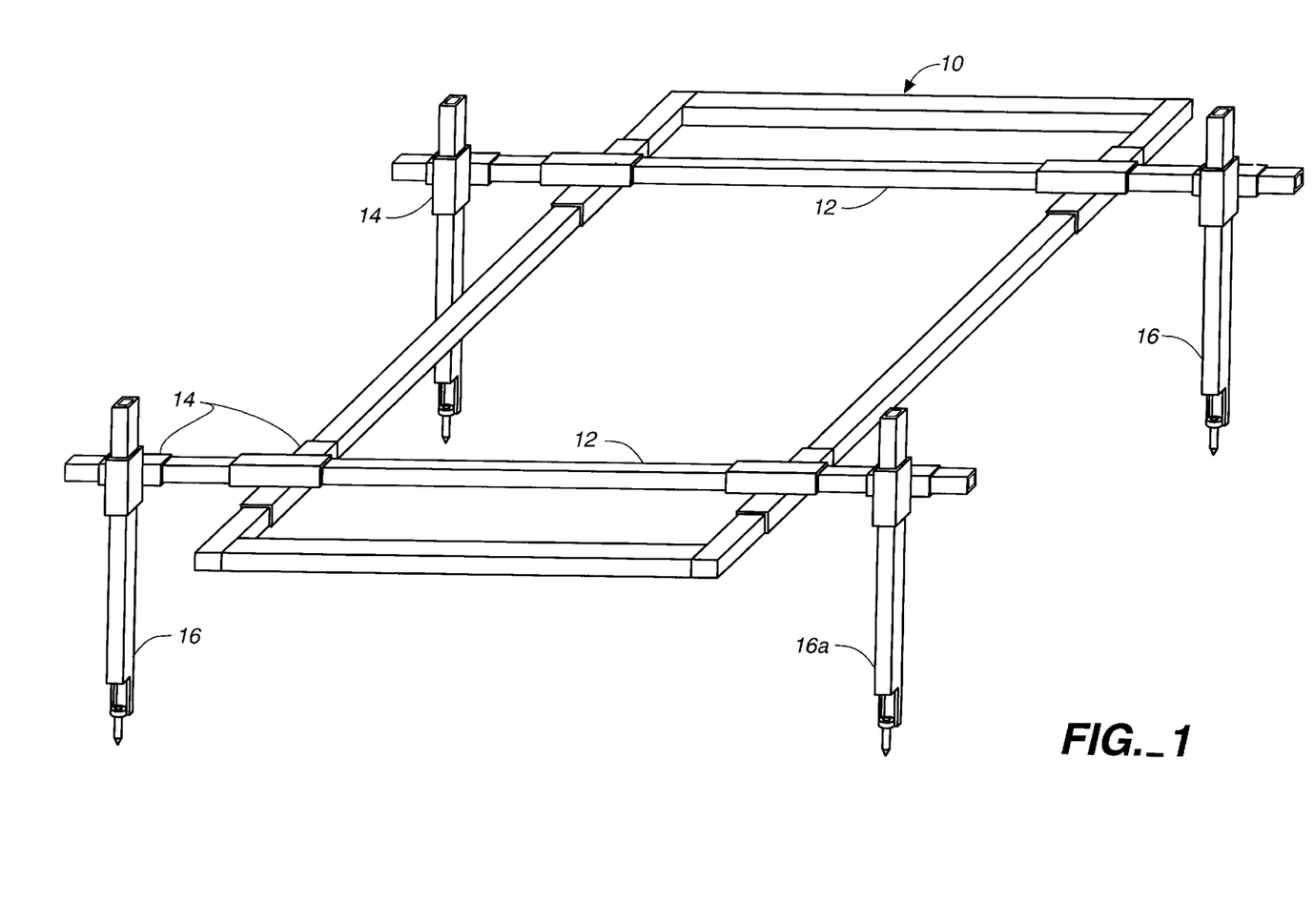
FIG. 1 is a perspective view of a vehicle body repair apparatus in accordance with the invention.
Figure 1A:
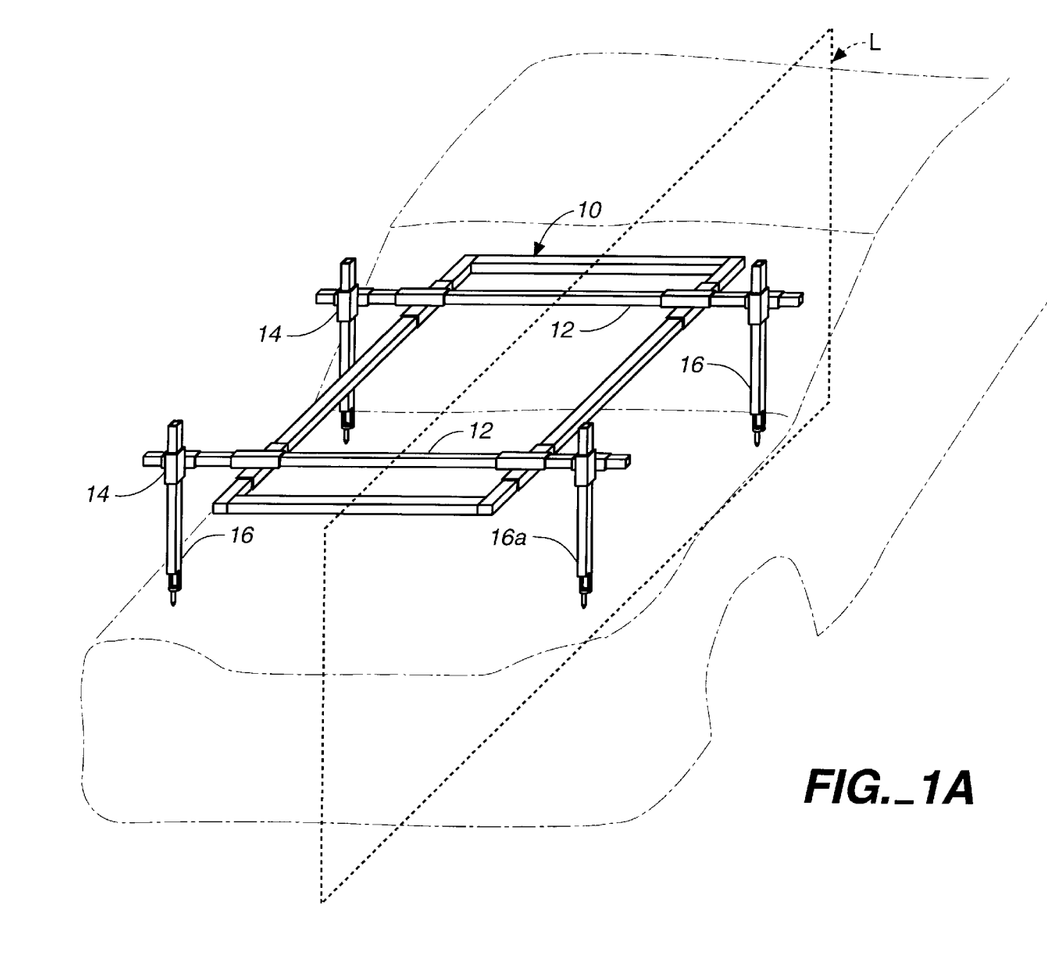
FIG. 1A is a perspective view of a vehicle body repair apparatus in accordance with the invention in typical disposition with respect to a vehicle.

Two or more rigid horizontal bars 12 are adjustably attached to the rigid framework 10 using a sleeve assembly 14. In the preferred embodiment, the sleeve assembly 14 holds each rigid horizontal bar 12 at right angles to the sides of the rigid framework 10 to which it is attached, yet preserves the adjustability of the horizontal bar 12 with respect to the framework 10. The horizontal bars 12 are thus adjustable longitudinally and transversely with respect to the rigid framework 10 and to the vehicle. To each horizontal bar 12 are attached two extension members 16. The extension members 16 are adjustably attached to the horizontal bars 12 using the same sleeve assembly 14. The extension members 16 are held at right angles to the horizontal bars 12 by the sleeve assembly 14, and are adjustable longitudinally and transversely with respect to the horizontal bars 12. Each extension member 16 is thus adjustable in three dimensions by appropriate adjustment of the extension member 16 itself and the horizontal bar 12 to which it is attached.

Figure 2:
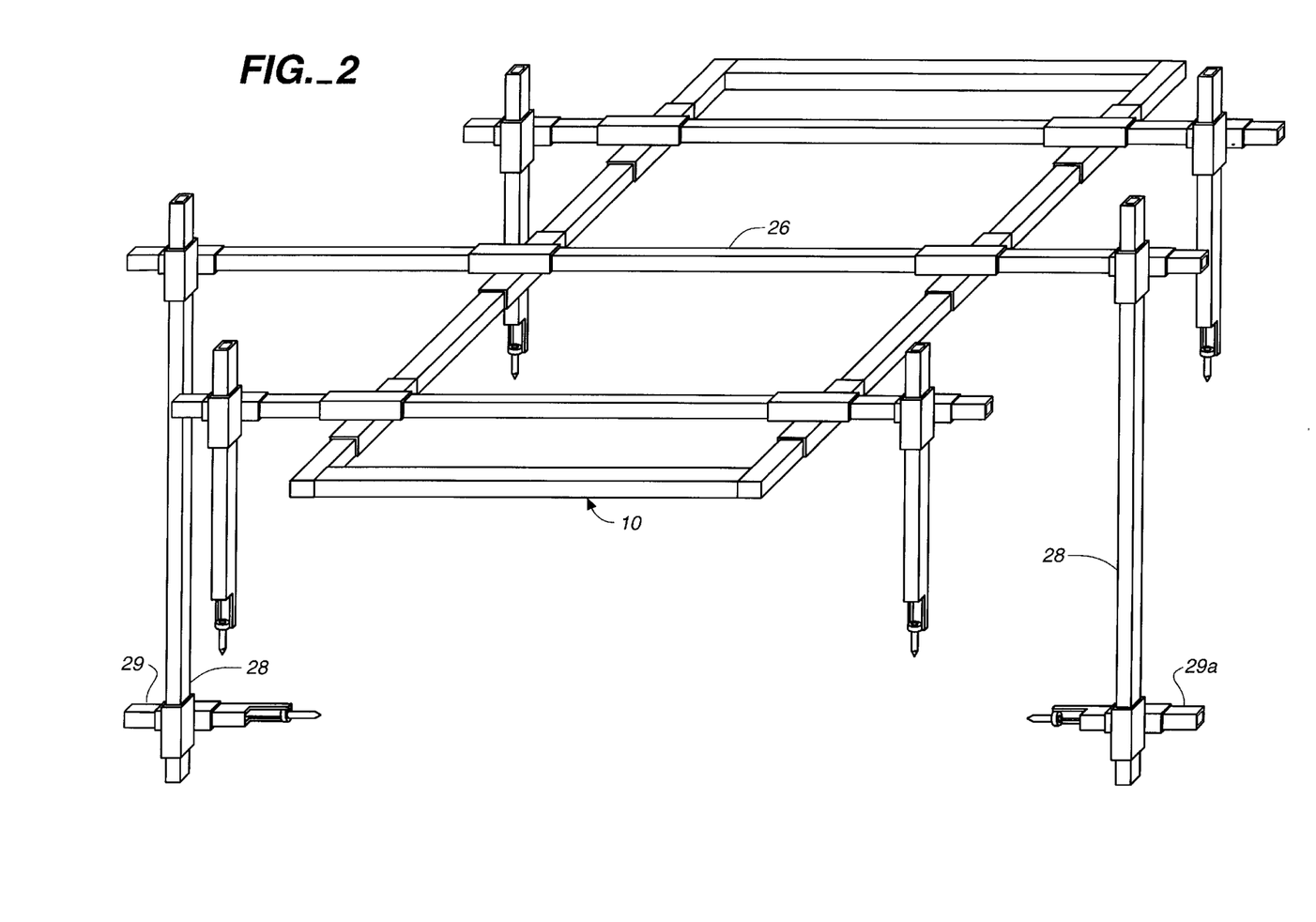
FIG. 2 is a perspective view of a vehicle body repair apparatus in accordance with the invention having additional horizontal bars and extension members attached to the rigid framework to facilitate disposition of side repair reference point extension members.
Figure 2A:
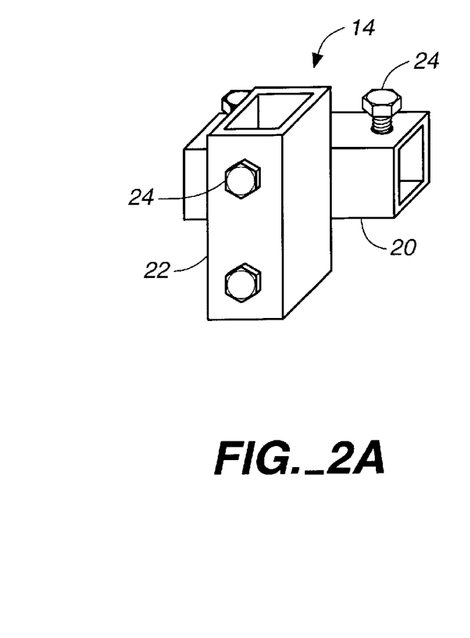
FIG. 2A is a perspective view of a sleeve assembly for adjustably securing horizontal bars and extension members to each other.
Figure 2B:
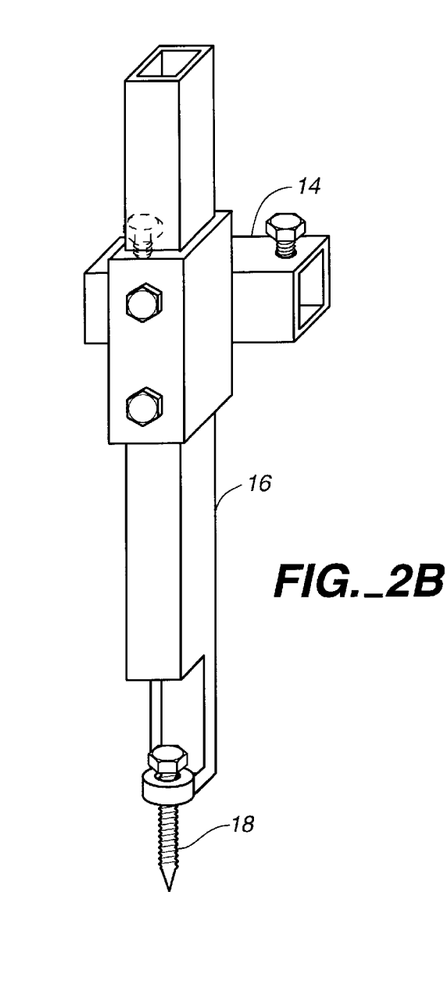
FIG. 2B is a perspective view of the sleeve assembly shown in FIG. 2A with an extension member disposed within one sleeve of the assembly.
Figure 2C:
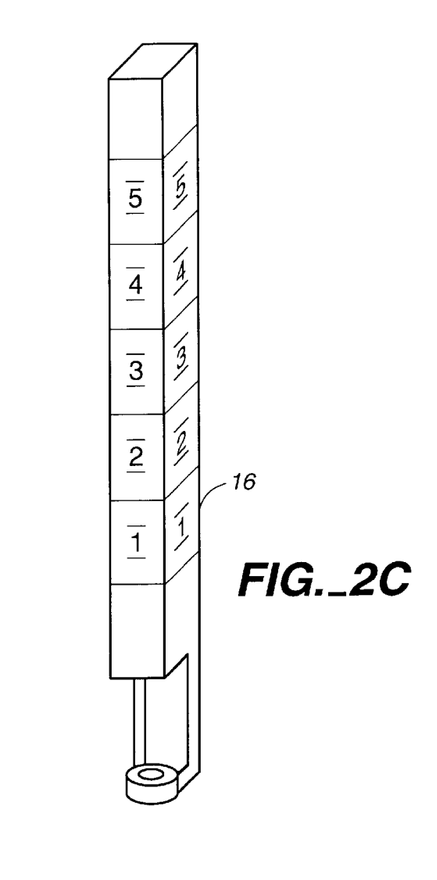
FIG. 2C is a perspective view of an extension member showing measuring indicia.

FIG. 2B shows a contact bolt 18 at the lower end of each extension member 16. In the preferred embodiment seen in FIG. 2B, the contact bolt 18 tapers to a point. The contact bolt 18 can be placed in contact with any point on the vehicle. Usually the contact bolts 18 of two transversely opposing extension members 16 will be screwed into or clamped onto transversely opposing comparable set points on or directly connected to major structural portions of the vehicle such as the upper aprons, wheel house reinforcement, fender, or rear or hood hinges. It can readily be appreciated that bolting the extension members 16 to the vehicle will make the invention easier to use, but it could be as effectively employed by merely physically holding the extension members 16 in position on the vehicle.

As shown in FIG. 2A, in the preferred embodiment the sleeve assembly 14 comprises a first sleeve 20 firmly affixed at right angles to a nearly identical second sleeve 22. Each sleeve is sized to receive a horizontal bar 12, an extension member 16 or a side of the rigid framework 10. Ideally the cross-sectional dimensions of the bars forming the rigid framework 10 will be identical to the dimensions of the horizontal bars 12 and the extension members 16 to allow the sleeve assemblies 14 to be used interchangeably anywhere on the apparatus. Any method of affixing the rigid framework 10, the horizontal bars 12 and the extension members 16 to each other could be used, such as U-clamps. But, in the preferred embodiments shown the sleeve assembly 14 holds the parts at right angles to one another eliminating the need for the user to establish right angles by manipulation of the invention. Adjustment bolts 24 or other like threaded fasteners hold the bars 12 or 16 or framework 10 firmly in place in the sleeves 20 and 22. Use of the sleeve assembly 14 to attach any two bars together results in each bar being adjustable transversely and longitudinally with respect to the other bar.

The majority of physical injuries to vehicles occur to one corner or side of the vehicle. This leaves the rest of the vehicle undamaged and in proper internal alignment. The undamaged portion of the vehicle can be used as a field of reference with respect to which the damaged portion can be repaired. The vehicle body repair apparatus exploits this fact. In typical use of the invention two set point extension members 16, both attached to the same horizontal bar 12, are mounted on undamaged areas of the vehicle at two set points. Normally these set points will be located somewhere on the upper body structure where there is ready access to numerous symmetrically disposed pairs of bolt holes. A third extension member 16 is then brought into contact with the vehicle body. Once the adjustment bolts 24 on the sleeve assemblies 14 are tightened, the rigid framework 10 is suspended above the vehicle body. If the area of damage to the vehicle is transversely opposite the position of the third extension member 16, a fourth extension member 16a is positioned at a point transversely opposed and longitudinally and vertically equivalent to the set position of the third extension member 16 to provide a repair reference point. The damaged portion of the vehicle is then repaired to the point of reference provided by the fourth extension member 16a. For simple repairs such as this it should be appreciated that the apparatus can work without mounting the set point extension members 16 on the vehicle by merely bringing the set point extension members 16 into contact with the undamaged portions of the vehicle at set points.

FIG. 2 shows another embodiment of the invention in which an additional horizontal top bar 26 is attached at right angles to the rigid framework 10. The horizontal top bar 26 is thus adjustable longitudinally and transversely with respect to the rigid framework 10. Long vertical bars 28, being somewhat longer than the extension members 16, are attached to the horizontal top bar 26 and are adjustable transversely and longitudinally with respect to the horizontal top bar 26. Horizontally disposed side extension members 29 are attached at right angles to the vertical bars 28. The side extension members 29 are adjustable longitudinally and transversely with respect to the vertical bars 28 and hence are adjustable in three dimensions by appropriate adjustment of the side extension member 29, the vertical bar 28 and the top bar 26. This embodiment allows one of the side extension members 29 to be brought into contact with an undamaged side portion of the vehicle opposite a damaged side portion of the vehicle. A second side extension member 29a acting as a repair reference point can be positioned opposite the damaged side area of the vehicle at the identical vertical and longitudinal coordinates of the first side extension member 29. The damaged side area of the vehicle may then be repaired to be symmetrical with the undamaged opposing portion of the vehicle using the opposing side extension members 29 and 29a for reference and comparison.

Figure 3:
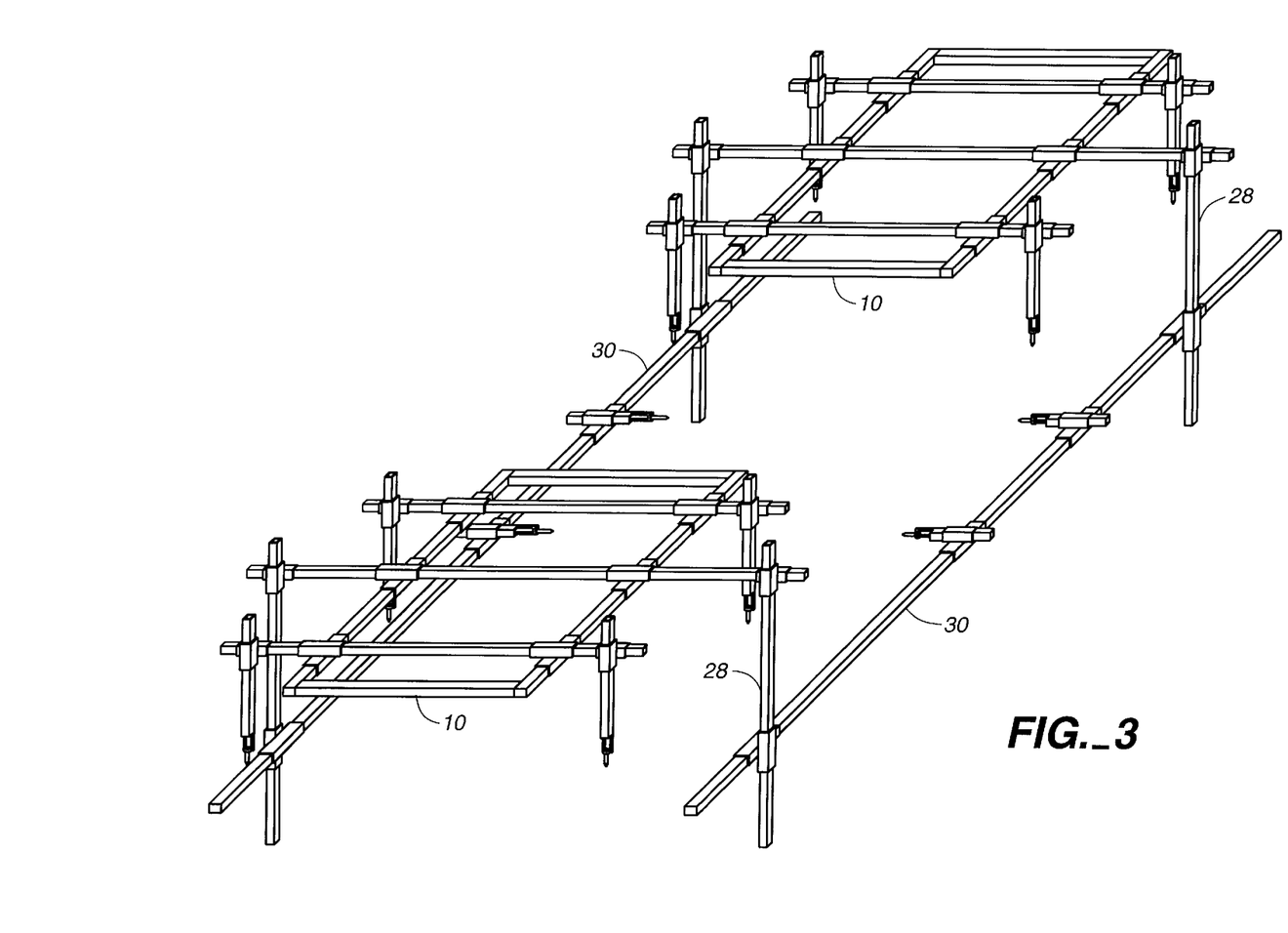
FIG. 3 is a perspective view of a vehicle body repair apparatus in accordance with the invention configured by connection of two of the basic apparatus configurations shown in FIG. 1 with side bars for facilitating disposition of one or more side repair reference point extension members.
Figure 3A:
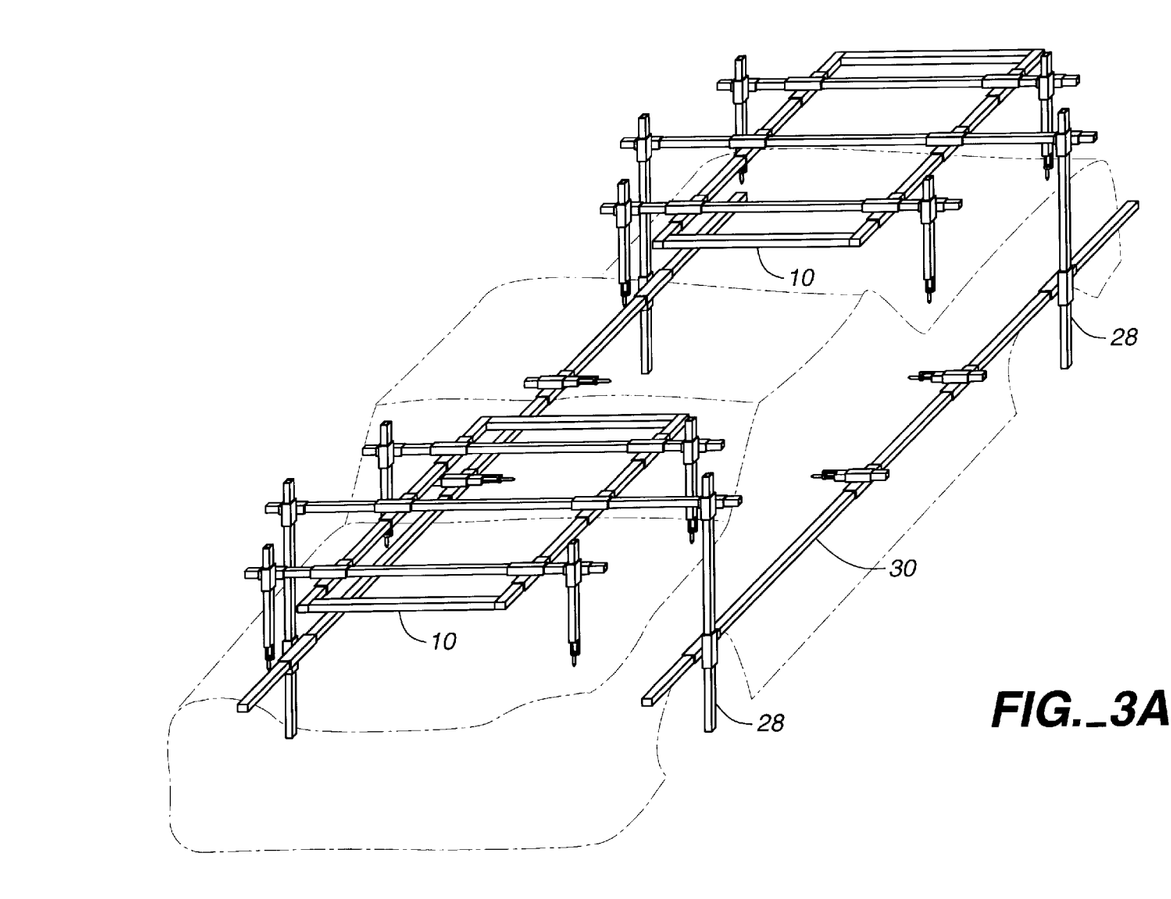
FIG. 3A is a perspective view of the configuration shown in FIG. 3 in typical disposition with respect to a vehicle.
Figure 3B:
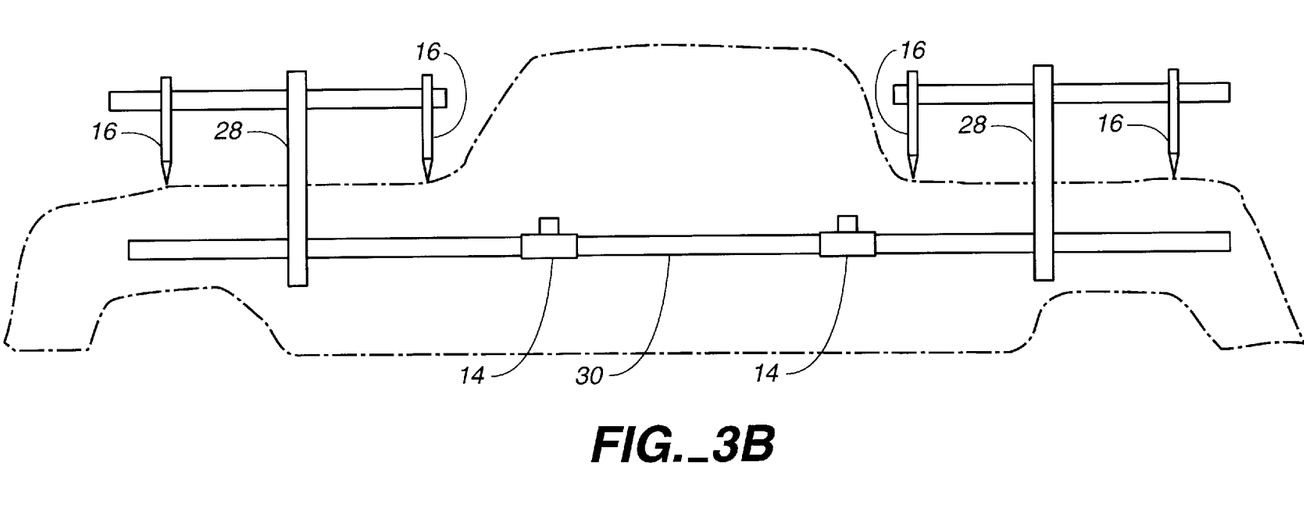
FIG. 3B is a simplified side view of the configuration of the invention shown in FIG. 3.

A complex configuration of the apparatus is shown in FIG. 3. Horizontally disposed side bars 30 are attached to the long vertical bars 28 of two of the configurations of the apparatus shown in FIG. 2, joining them together. The side bars 30 are thus adjustable transversely and longitudinally with respect to the vertical bars 28. One or more side extension members 29 are attached to the side bars 30 for added capability in reaching damaged portions on the sides of the vehicle. In this embodiment the side extension members 29 are adjustable longitudinally and transversely with respect to the side bars 30 and hence are adjustable longitudinally, transversely and vertically with respect to the rigid framework 10 and the vehicle. This embodiment of the invention allows repairs to more difficult to reach damaged portions of the vehicle to be effected using the symmetry of the vehicle as above described. As shown by FIG. 3B, the side bars 30 effectively extend the range, rigidity and capability of the apparatus.

Figure 4:
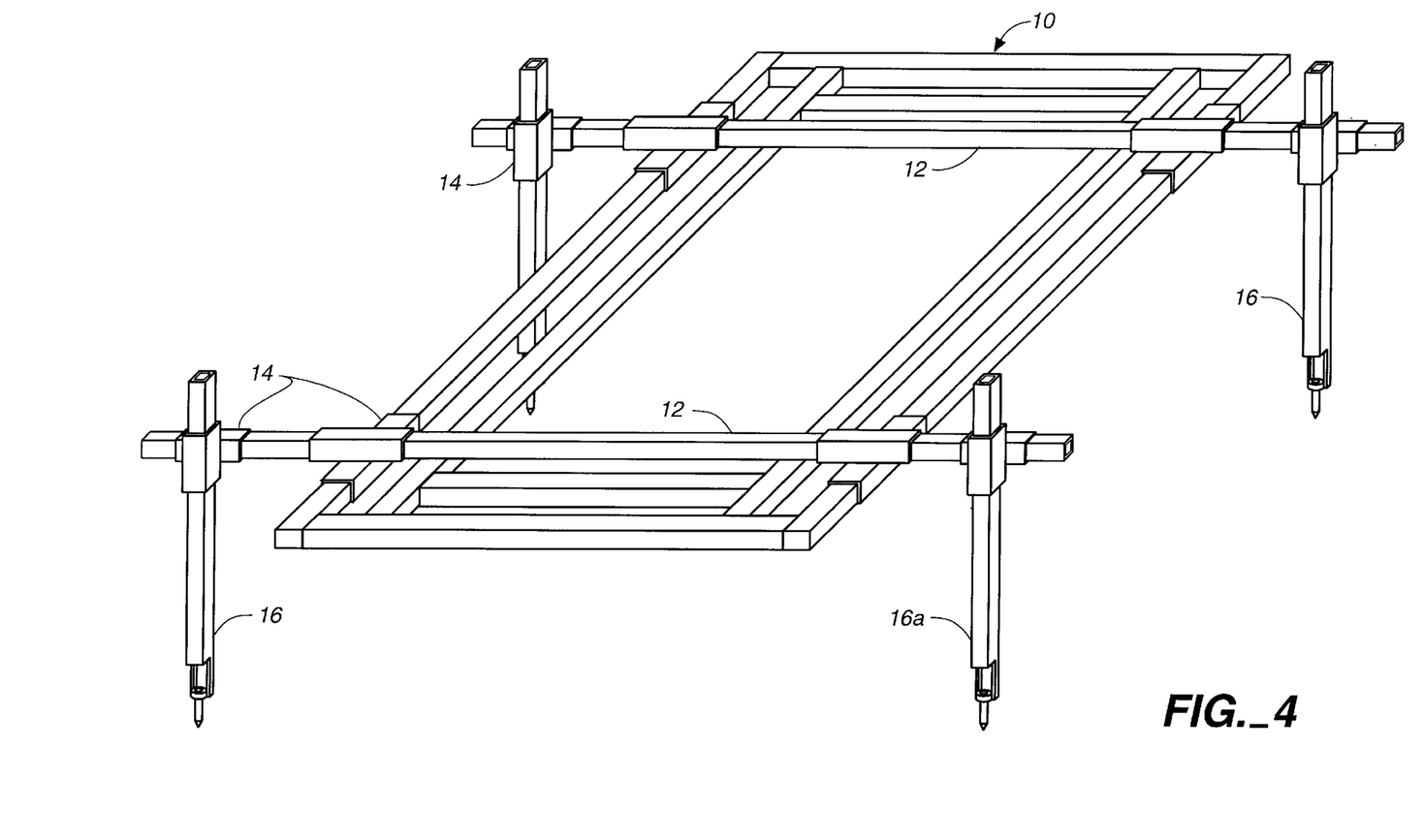
FIG. 4 is a perspective view of a vehicle body repair apparatus in accordance with the invention showing the rigid framework having double side bars.

In another preferred embodiment of the invention, the horizontal bars 12 and extension members 16 have measuring indicia as seen in FIG. 4 to assist in equalizing the longitudinal, vertical and transverse coordinates of transversely opposed extension members 16 or 29.

In any embodiment, once the point has been established as to which the damaged area is to be repaired and the repair reference point extension member 16a or 29a has been positioned at that point, either the damaged structural portion can be bent to bring it into contact with the repair reference extension member 16a or 29a, or a component part of the vehicle can be attached to the vehicle using the repair reference extension member 16a or 29a as a symmetrical reference point.

Referring again generally to the embodiment shown in FIG. 1, the field of reference of the undamaged portion of the vehicle, which is transmitted to the fourth extension member 16a through the rigid framework 10, is especially useful in effecting vertical alignment or placement repairs. The invention is thus an efficient complement to expensive and cumbersome frame straightening devices. The invention can be quickly and easily assembled and disassembled making it ideally suited to upper body repairs. It has the added virtue of needing only the vehicle itself to form a field of reference for the damaged area without needing to be independently supported and can be used without reference to manufacturers' data or charts. Further, it does not require expensive support equipment or immobilization of the vehicle with respect to that equipment.

There have thus been described certain preferred embodiments of a vehicle body repair apparatus. While preferred embodiments have been described and disclosed, it will be recognized by those with skill in the art that modifications are within the true spirit and scope of the invention. The appended claims are intended to cover all such modifications.

I claim:

1. An apparatus for repairing the body of a vehicle, the vehicle having a damaged area and a plurality of set points, including at least first, second and third set points on undamaged areas of the vehicle, said apparatus comprising:

a rigid framework, an extension assembly depending from said rigid framework having a plurality of extension members including at least three downwardly depending set point extension members for making contact with the first, second and third set points on the vehicle and for supporting said rigid framework in a fixed position above the vehicle body, at least one repair reference point member for extension from said rigid framework to a predetermined repair reference point adjacent the damaged area, said predetermined repair reference point symmetrically opposed to one of the first, second and third set points, each of said extension members including securing means for demountably securing said respective extension member to one of the set points on the vehicle, said extension assemble including interconnecting means for adjustably interconnecting said extension members and said rigid framework, said set point extension members of said extension assembly adjustably extendable from said rigid framework to the set points on the vehicle, means for adjustably attaching said repair reference point member and said rigid framework, said repair reference point member of said extension assembly adjustably extendable from said rigid framework to said predetermined repair reference point to which the damaged areas of the vehicle can be repaired by comparing said predetermined repair reference point with the set points on the vehicle, and means for supporting said rigid framework in a fixed position above the vehicle body, said means for supporting consisting of said extension members, said interconnecting means, and said securing means.

2. The apparatus of claim 1 wherein the rigid framework is planar.

3. The apparatus of claim 2 wherein the rigid framework is rectangular.

4. The apparatus of claim 1 wherein:

the rigid framework is rectangular and includes a plurality of framework members, said framework members comprising two sets of sidebars, wherein the sidebars of each set are spaced apart from and parallel to each other.

5. The apparatus of claim 1 wherein said securing means comprises a threaded bolt.

6. The apparatus of claim 1 wherein said extension members include measuring indicia.

7. The apparatus of claim 1 wherein the means for interconnecting said extension members and said rigid framework includes:

a plurality of rigid horizontal bars, said rigid horizontal bars adjustably secured to the rigid framework and adjustable longitudinally and transversely with respect to said rigid framework, said extension members adjustably attached to and depending from said rigid horizontal bars and adjustable longitudinally and transversely with respect to said rigid horizontal bars.

8. The apparatus of claim 1 wherein said rigid framework has a plurality of framework members, said framework members each having a square cross-section, said extension members have cross-sectional dimensions substantially equivalent to the cross-sectional dimensions of said framework members of said rigid framework, the adjustment means comprises a plurality of sleeve assemblies, each one of said plurality of sleeve assemblies having:

a first sleeve sized to receive one of said framework members of said rigid framework and said extension members, fastening means located on said first sleeve for adjustably fastening said first sleeve in a determined position along a respective one of said framework members or a respective one of said extension members, a second sleeve fixed at right angles to said first sleeve and sized to receive one of said framework members of said rigid framework and said extension members, and fastening means located on said second sleeve for adjustably fastening the second sleeve in a determined position along said respective framework member or said respective extension member.

9. The apparatus of claim 1 further comprising:

at least one horizontally disposed side repair reference point member, and means for adjustably extending said side repair reference point member to the predetermined repair reference point to which a damaged area on the side of the vehicle can be repaired.

10. The apparatus of claim 9 further comprising:

at least one rigid top bar, said top bar adjustably secured to said rigid framework and adjustable transversely and longitudinally with respect to said rigid framework, and at least one vertical bar, said vertical bar adjustably attached to said top bar, said vertical bar adjustable longitudinally and transversely with respect to said top bar.

11. The apparatus of claim 10 wherein:

said side repair reference point member is adjustably secured to said vertical bar, said side repair reference point member adjustable transversely and longitudinally relative to said vertical bar.

12. The apparatus of claim 9 further comprising:

at least one rigid top bar, said rigid top bar adjustably secured to said rigid framework and adjustable transversely and longitudinally with respect to said rigid framework, and at least one vertical bar, said vertical bar adjustably attached to said rigid top bar, and adjustable vertically and transversely with respect to said rigid top bar.

13. The apparatus of claim 12 further comprising:

at least one rigid horizontal side bar for placement parallel to the longitudinal axis of the vehicle and adjacent to and spaced from one side of the vehicle, said rigid horizontal side bar adjustably attached to said vertical bar, said rigid horizontal side bar and said vertical bar in substantially the same plane, said rigid horizontal side bar for placement along substantially the length of the vehicle, said rigid horizontal side bar adjustable longitudinally and transversely with respect to said vertical bar, said side repair reference point member adjustably attached to said rigid horizontal side bar, said side repair reference point member adjustable transversely and longitudinally with respect to said rigid horizontal side bar.

14. The apparatus of claim 1 wherein:

said rigid framework is planar, said extension assembly has a plurality of rigid horizontal bars adjustably secured to said rigid framework and adjustable longitudinally and transversely with respect to said rigid framework, and said set point extension members are adjustably secured at right angles to said horizontal bars, and are adjustable longitudinally and transversely with respect to said horizontal bars.

15. The apparatus of claim 14 wherein:

said repair reference point member is adjustably secured at right angles to one of said horizontal bars and is adjustable longitudinally and transversely with respect to said horizontal bars.

16. The apparatus of claim 14 further comprising:

at least one vertical bar, said vertical bar adjustably secured at right angles to an additional horizontal bar and adjustable transversely and longitudinally relative to said horizontal bar.

17. The apparatus of claim 16 wherein:

a horizontally disposed side repair reference point member is adjustably secured at right angles to said vertical bar and is adjustable transversely and longitudinally relative to said vertical bar.

18. The apparatus of claim 16 further comprising:

at least one rigid horizontal side bar for placement substantially parallel to the longitudinal axis of the vehicle and adjacent to and spaced from one side of the vehicle, said rigid horizontal side bar adjustably attached to said vertical bar at right angles, said rigid horizontal side bar and said vertical bar in substantially the same plane, said rigid horizontal side bar for placement along substantially the length of the vehicle and adjustable longitudinally and transversely with respect to said vertical bar, a horizontally disposed side repair reference point member adjustably secured to said rigid horizontal side bar at right angles and adjustable transversely and longitudinally relative to said horizontal side bar.

19. A method for repairing the body of a vehicle, the vehicle having a damaged area and a plurality of set points, including at least first, second and third set points on undamaged areas of the vehicle, said method comprising:

providing an extension assembly having a plurality of extension members including at least three set point extension members, providing at least one repair reference point member, using interconnecting means to interconnect said extension members and a rigid framework, interconnecting said repair reference point member and said rigid framework, suspending said rigid framework in a fixed position above the vehicle body, extending each of said first, second and third set point extension members from said rigid framework to one of the set points on the vehicle, using securing means to demountably secure said first, second and third set point extension members to the set points on the vehicle, and adjustably extending said repair reference point extension member of said extension assembly to a predetermined repair reference point adjacent the damaged area to which the damaged area of the vehicle can be repaired, wherein the rigid framework is suspended above the vehicle solely by the extension members, the interconnecting means, and the securing means.

* * * * *